US008102853B2

(12) United States Patent
Ngo et al.

(10) Patent No.: US 8,102,853 B2
(45) Date of Patent: Jan. 24, 2012

(54) SYSTEM AND METHOD FOR WIRELESS COMMUNICATION OF UNCOMPRESSED VIDEO HAVING FIXED SIZE MAC HEADER WITH AN EXTENSION

(75) Inventors: Chiu Ngo, San Francisco, CA (US); Harkirat Singh, Santa Clara, CA (US); Huai-Rong Shao, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 921 days.

(21) Appl. No.: 11/690,290

(22) Filed: Mar. 23, 2007

(65) Prior Publication Data

US 2008/0037540 A1 Feb. 14, 2008

Related U.S. Application Data

(60) Provisional application No. 60/836,870, filed on Aug. 9, 2006.

(51) Int. Cl.
*H04L 12/56* (2006.01)
*H03M 13/00* (2006.01)

(52) U.S. Cl. .......................... 370/392; 714/758; 714/776

(58) Field of Classification Search .................. 370/392, 370/471; 714/758, 776
See application file for complete search history.

(56) References Cited

U.S. PATENT DOCUMENTS

| 5,673,031 | A  | * | 9/1997  | Meier ............................. 340/2.4 |
| 6,865,609 | B1 | * | 3/2005  | Gubbi et al. .................. 709/230 |
| 7,203,227 | B1 | * | 4/2007  | Currivan et al. .............. 375/222 |
| 7,274,740 | B2 | * | 9/2007  | van Beek et al. ......... 375/240.02 |
| 7,280,975 | B1 | * | 10/2007 | Donner ............................ 705/10 |
| 7,515,606 | B2 | * | 4/2009  | Kim et al. ...................... 370/466 |
| 2002/0090007 | A1 | * | 7/2002  | Kamiya et al. ................ 370/476 |
| 2002/0167962 | A1 | * | 11/2002 | Kowalski ....................... 370/445 |
| 2003/0086366 | A1 | * | 5/2003  | Branlund et al. ............. 370/208 |
| 2003/0161347 | A1 | * | 8/2003  | Metchalf ........................ 370/493 |

(Continued)

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications IEEE Std 802.11™-2007 (Revision of IEEE Std 802.11-1999).*

(Continued)

*Primary Examiner* — Dang Ton
*Assistant Examiner* — Ryan Kavleski
(74) *Attorney, Agent, or Firm* — Kenneth L. Sherman, Esq.; Michael Zarrabian, Esq.; Myers Andras Sherman & Zarrabian LLP

(57) ABSTRACT

A data structure of a MAC header for a WirelessHD communication system including an application layer, a media access controller (MAC) layer, and a physical (PHY) layer, includes, a payload data packet from the application layer; a MAC header of a fixed length; a MAC header extension of a variable length; a MAC header extension control field which signals if a particular field needs to be included or excluded; a PHY header for synchronizing the behavior of the PHY layer; a first CRC segment for a cyclic redundancy checksum for checking transmission of the MAC header and the PHY header; and a second CRC segment for a cyclic redundancy checksum for checking transmission of the MAC header extension. Either the MAC header or the MAC header extension includes a size indication of the MAC header extension for facilitating checking of the second CRC segment.

37 Claims, 14 Drawing Sheets

U.S. PATENT DOCUMENTS

| | | | |
|---|---|---|---|
| 2005/0113102 A1 | 5/2005 | Kwon et al. | |
| 2005/0135284 A1* | 6/2005 | Nanda et al. | 370/294 |
| 2005/0135295 A1* | 6/2005 | Walton et al. | 370/328 |
| 2005/0135318 A1* | 6/2005 | Walton et al. | 370/338 |
| 2005/0141553 A1* | 6/2005 | Kim et al. | 370/466 |
| 2005/0186933 A1* | 8/2005 | Trans | 455/296 |
| 2005/0276252 A1* | 12/2005 | Sizeland et al. | 370/338 |
| 2006/0002393 A1 | 1/2006 | Lappin, Jr. et al. | |
| 2006/0050742 A1* | 3/2006 | Grandhi et al. | 370/506 |
| 2006/0052088 A1* | 3/2006 | Pavon et al. | 455/414.1 |
| 2006/0056443 A1* | 3/2006 | Tao et al. | 370/462 |
| 2006/0095942 A1* | 5/2006 | van Beek | 725/81 |
| 2006/0095943 A1* | 5/2006 | Demircin et al. | 725/81 |
| 2006/0095944 A1* | 5/2006 | Demircin et al. | 725/81 |
| 2006/0174032 A1* | 8/2006 | Winchester et al. | 709/238 |
| 2007/0098007 A1* | 5/2007 | Prodan et al. | 370/443 |
| 2007/0104215 A1* | 5/2007 | Wang et al. | 370/458 |
| 2007/0110055 A1* | 5/2007 | Fischer et al. | 370/389 |
| 2007/0153916 A1* | 7/2007 | Demircin et al. | 375/240.26 |
| 2007/0195761 A1* | 8/2007 | Tatar et al. | 370/389 |
| 2007/0195773 A1* | 8/2007 | Tatar et al. | 370/392 |
| 2007/0195777 A1* | 8/2007 | Tatar et al. | 370/392 |
| 2007/0195778 A1* | 8/2007 | Tatar et al. | 370/392 |
| 2007/0223527 A1 | 9/2007 | Shao et al. | |
| 2007/0291939 A1 | 12/2007 | Singh et al. | |
| 2008/0130561 A1 | 6/2008 | Shao et al. | |

OTHER PUBLICATIONS

IEEE Standard forInformation technology-Telecommunications and information exchange between systems—Local and metropolitan area networks-Specific requirements Part 15.3: Wireless Medium Access Control (MAC) and Physical Layer (PHY) Specifications for High Rate Wireless Personal Area Networks (WPANs) IEEE Std 802.15.3TM-2003.*

IEEE Standards Board, "802.11 Wireless LAN Medium Access Control and Physical Layer Specifications 1999 Edition," Jun. 2003, IEEE Computer Society, pp. 49-73.*

Maruhashi, K,: Kishimoto, S.; Ito, M.; Ohata, K.; Hamada, Y.; Morimoto, T.; Shimawaki, H., "Wireless uncompressed-HDTV-signal; transmission system utilizing compact 60-GHz-band transmitter and receiver", Microwave Symposium Digest, 2005 IEEE MTTS International, Jun. 12-17, 2005.

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003.

Distributed Medium Access Control (MAC) for wireless networks, WiMedia Alliance, Draft 0.99, Nov. 1, 2005.

High-Definition Multimedia Interface (HDMI) Specifications version 1.2, Aug. 22, 2005.

International Search Report for PCT/KR2007003217 dated on Oct. 10, 2007.

International Preliminary Report on Patentability dated Feb. 10, 2009 in PCT/KR2007/003217, filed Jul. 3, 2007.

FreshNews.com, SiBEAM Receives Equity Investment from Best Buy, http://freshnews.com/print/node/261440, Jan. 4, 2010, 2 pages.

Hachman, "CE Giants back Amimon's Wireless HDTV Tech," online: www.pcmag.com, 1 page, Jul. 23, 2008.

LG Electronics Inc., WirelessHD Specification Version 1.0 Overview, Oct. 9, 2007, 77 pages.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).

Korean Office Action dated May 25, 2009 issued in Korean Patent Application No. 10-2008-7007941, Korean Intellectual Property Office, pp. 1-4, Seo-gu, Daejeon, Republic of Korea.

Korean Office Action dated Jan. 21, 2010 issued in Korean Patent Application No. 10-2008-7007941, Korean Intellectual Property Office, pp. 1-3, Seo-gu, Daejeon, Republic of Korea.

Korean Notice of Allowance dated Aug. 25, 2010 issued in Korean Patent Application No. 10-2008-7007941, Korean Intellectual Property Office, pp. 1-5, Seo-gu, Daejeon, Republic of Korea.

* cited by examiner

| Octets: 2 | 2 | 1 | 1 | 1 | 1 | 1 |
|---|---|---|---|---|---|---|
| MAC Control | MAC header extension control | DestID | SrcID | WVNID | Stream Index | Sequence Number |
| 710 | 730 | 751 | 753 | 755 | 757 | 759 |

FIG. 7

| Bits: 2 | 6 | 2 | 1 | 1 | 1 | 2 | 1 |
|---|---|---|---|---|---|---|---|
| Protocol Version | Packet Type | ACK Policy | Security | Retry | More data | Transport Priority | Reserved |
| 711 | 712 | 713 | 714 | 715 | 716 | 717 | 718 |

FIG. 8

| Bits: 1 | 1 | 1 | 5 | 8 |
|---|---|---|---|---|
| Link Adaptation Extension | Composite Frame | ReBoM | Reserved | MAC header extension length |
| 731 | 732 | 733 | 734 | 735 |

| Bits: 8 |
|---|
| MAC header extension length |
| 735' |

FIG. 15

| Octets: 2 | 1 | 1 | 1 | 1 | 1 | 1 |
|---|---|---|---|---|---|---|
| MAC Control | MAC header extension control | DestID | SrcID | WVNID | Stream Index | Sequence Number |
| 710' | 730' | 751' | 753' | 755' | 757' | 759' |

FIG. 16

| 1 | 1 | 1 | Bits: 5 |
|---|---|---|---|
| Link Adaptation Extension | Composite Frame | ReBoM | Reserved |
| 731' | 732' | 733' | 734' |

730'

SYSTEM AND METHOD FOR WIRELESS COMMUNICATION OF UNCOMPRESSED VIDEO HAVING FIXED SIZE MAC HEADER WITH AN EXTENSION

RELATED APPLICATION

This application claims priority from U.S. Provisional Patent Application No. 60/836,870, filed on Aug. 9, 2006, which is incorporated herein by reference.

BACKGROUND

1. Field

The invention relates to wireless communication and more particularly to wireless transmission of video information, and in particular, to transmission of uncompressed high definition video information over wireless channels using a MAC header of a fixed size.

2. Description of Related Technology

With the proliferation of high quality video, an increasing number of electronic devices, such as consumer electronic devices, utilize high definition (HD) video which can require about 1 G bps (bits per second) in bandwidth for transmission. As such, when transmitting such HD video between devices, conventional transmission approaches compress the HD video to a fraction of its original size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices are connected which do not have the bandwidth to carry the uncompressed HD signals.

SUMMARY

A method of communicating uncompressed high definition video information over wireless channels is provided.

One aspect of the invention provides a system and method for communicating uncompressed high definition video information over wireless channels using a data structure of the MAC header of a fixed length. Another aspect of the invention also provides a system and method for communicating uncompressed high definition video information over wireless channels using a MAC header extension of a variable length and a size indication of the MAC header extension provided in either a MAC header or a MAC header extension to facilitate computing the cyclic redundancy checksum for the MAC header extension.

One aspect of the invention provides a data structure of a MAC header for a High Definition communication system, using an open systems interconnection (OSI) reference model including an application layer, a media access controller (MAC) layer, and a physical (PHY) layer.

The data structure comprises: a payload data packet received from the application layer; a MAC header of a fixed length for controlling a plurality of first type of functions of the MAC layer; a MAC header extension of a variable length for controlling a plurality of second type of functions of the MAC layer; a PHY header for synchronizing the behavior of the PHY layer; a first CRC segment for a cyclic redundancy checksum for checking transmission of the MAC header and the PHY header; and a second CRC segment for a cyclic redundancy checksum for checking transmission error of the MAC header extension. The MAC header comprises a size indication of the MAC header extension, the size indication referred in facilitating checking of the second CRC segment. The payload includes a separate CRC field for detecting transmission errors at the receiver.

The first type of functions may perform processes comprising: controlling the MAC layer; controlling the MAC header extension; indicating a destination device of the payload data packet; indicating a source device of the payload data packet; identifying a wireless video audio network to which the destination and source devices belong; identifying the type of the data packet; and indexing the data packet.

The MAC header may comprise: a MAC control field for controlling the MAC layer; a MAC header extension control field for controlling the MAC header extension; a destination ID field for indicating a destination device of the payload data packet; a source ID field for indicating a source device which provided the payload data packet; a wireless video audio network ID field for identifying a wireless video audio network to which the destination and source devices belong; a stream index field for identifying the type of the data packet; and a sequence number field provided by a modulo-counter for indexing the data packet.

The MAC control field may comprise: a protocol version field for indicating a version of a protocol used for the data packet; a packet type field for indicating a type of the data packet; an ACK policy field for indicating an ACK policy; a security bit for indicating secure data packets; a retry bit for indicating if the packet is either a data packet or MAC command and if the packet is retransmitted; a more-data bit for indicating whether the device will be sending any more packets in the reserved time block; and a transport priority field for indicating the priority of the packet.

The MAC header extension control field may comprise: an MAC header extension length field for indicating the length of the MAC header extension; a link adaptation extension bit; a ReBoM (reliable broadcast or multicast) control bit; and a composite frame control bit.

The modulo counter may comprise a modulo 256 counter, and wherein the sequence number is incremented for each packet sent. The first CRC segment may be set by CRC-16 or CRC-32 defined in IEEE 802.11 standard. The second type of function may comprise device-dependent functions and application-dependent functions.

The MAC header extension may comprise a ReBoM header, a Link adaptation extension header, and a composite frame header, and wherein presence or absence of the ReBoM header, the Link adaptation extension header, and the composite frame header are determined by values of the corresponding MAC header extension control bits.

Another aspect of the invention provides a method of communicating payload data in a High Definition communication system using an OSI model including an application layer, a MAC layer, and a PHY layer.

The method comprises: receiving payload data comprising uncompressed video data from the application layer; encapsulating at least a portion of the payload data with a MAC header of a fixed size, a MAC header extension of a variable size, a first checking data segment, and a second checking data segment to produce MAC Protocol Data Unit (MPDU); appending a synchronization header (PHY header) for a PHY layer to the MPDU; and transmitting the PHY header appended MPDU to a receiver.

The first checking data segment may comprise a first cyclic redundancy checksum (first CRC) for the PHY header and the MAC header, wherein the second checking data segment comprises a second cyclic redundancy checksum (second CRC) for the MAC header extension, wherein the PHY header and the MAC header for which the first CRC is computed is of a fixed size, and wherein the MAC header comprises a size indication of the MAC header extension which facilitates calculating of the second CRC. The MAC header extension may comprise device-dependent fields and application-dependent fields.

The MAC header extension may further comprise a ReBoM header, a Link adaptation extension header, and a composite frame header, and wherein presence or absence of the ReBoM header, the Link adaptation extension header, and the composite frame header is determined by values of corresponding MAC header extension control bits in the MAC header.

The method may further comprise: generating a first cyclic redundancy checksum for the PHY header and the MAC header at the receiver; generating a second cyclic redundancy checksum for the MAC header extension at the receiver; and determining whether the act of transmitting is successful by comparing the computed first and second cyclic redundancy checksum with the received first and second cyclic redundancy checksum.

The act of computing the second cyclic redundancy checksum may comprise using the size indication of the MAC header extension extracted from the MAC header extension. The act of determining comprises determining the act of transmitting is successful when the computed first cyclic redundancy checksum is matched with the received first cyclic redundancy checksum.

The first CRC segment may be computed by using CRC-16 or CRC-32 defined in IEEE 802.11 standard. The MAC header extension may further comprise device-dependent fields and application-dependent fields. The MAC header extension may comprise a ReBoM header, a Link adaptation extension header, and a composite frame header, and wherein presence or absence of the ReBoM header, the adaptation extension header, and the composite frame header are determined by values of the corresponding MAC header extension control bits.

Still another aspect of the invention provides a system for communicating payload data in a High Definition communication system using an OSI model including an application layer, a MAC layer, and a PHY layer.

The system comprises: means for receiving payload data comprising uncompressed video data from the application layer; means for encapsulating at least a portion of the payload with a MAC header of a fixed size, a MAC header extension of a variable size, a first checking data segment, and a second checking data segment to produce MAC Packet Data Unit (MPDU); means for appending a synchronization header (PHY header) for a PHY layer to the MPDU; and means for transmitting the PHY header appended MPDU to a receiver.

The first checking data segment may comprise a first cyclic redundancy checksum (first CRC) for the PHY header and the MAC header, wherein the second checking data segment comprises a second cyclic redundancy checksum (second CRC) for the MAC header extension, wherein the PHY header and the MAC header for which the first CRC is computed is of fixed size, and wherein the MAC header comprises a size indication of the MAC header extension which facilitates calculating of the second CRC.

The MAC header extension may comprise device-dependent fields and application-dependent fields. The MAC header extension may further comprise a ReBoM header, a Link adaptation extension header, and a composite frame header, and wherein presence or absence of the ReBoM header, the adaptation extension header, and the composite frame header is determined by values of corresponding MAC header extension control bits in the MAC header.

The system may further comprise: means for generating a first cyclic redundancy checksum for the PHY header and the MAC header at the receiver; means for generating a second cyclic redundancy checksum for the MAC header extension at the receiver; and means for determining whether the transmission is successful by comparing the computed first and second cyclic redundancy checksum with the received first and second cyclic redundancy checksum.

The means for computing the second cyclic redundancy checksum may comprise a means for using the size indication of the MAC header extension extracted from the MAC header. The first CRC segment may be computed by using CRC-16 or CRC-32 defined in IEEE 802.11 standard.

Still another aspect of the invention provides a data structure of a MAC header for a High Definition communication system, using an OSI model including an application layer, a MAC layer, and a PHY layer.

The data structure comprises: a payload data packet from the application layer; a MAC header of a fixed length; a MAC header extension of a variable length; a PHY header for synchronizing the behavior of the PHY layer; a first CRC segment for a cyclic redundancy checksum for checking transmission of the MAC header and the PHY header; and a second CRC segment for a cyclic redundancy checksum for checking transmission of the MAC header extension. The MAC header extension comprises a size indication of the MAC header extension for facilitating checking of the second CRC segment. The payload includes a separate CRC field for detecting transmission errors at the receiver.

The MAC header may comprise: a MAC control field for controlling the MAC layer; a MAC header extension control field for controlling the MAC header extension; a destination ID field for indicating a destination device of the payload data packet; a source ID field for indicating a source device of the payload data packet; a wireless video audio network ID field for identifying a wireless video audio network to which the destination and source devices belong; a stream index field for identifying the type of the data packet; and a sequence number field provided by a modulo-counter for indexing the data packet.

The MAC header extension control field may comprise: an MAC header extension length field for indicating the length of the MAC header extension; a link adaptation extension bit; a ReBoM (reliable broadcast or multicast) control bit; and a composite frame control bit.

The MAC header extension may comprise a ReBoM header, an adaptation extension header, and a composite frame header, and wherein presence or absence of the ReBoM header, the adaptation extension header, and the composite frame header are determined by values of the corresponding MAC header extension control bits.

The composite frame header may be of a variable length, and wherein if the composite frame control bit is set, the composite frame header is included in the MAC header extension and a size indication of the MAC header extension is included in the MAC header extension.

Still another aspect of the invention provides a data structure of a MAC header for a High Definition communication system, using an open systems interconnection (OSI) reference model including an application layer, a media access controller (MAC) layer, and a physical (PHY) layer.

The data structure comprises: a payload data packet received from the application layer; a MAC header of a fixed length for controlling a plurality of first type of functions of the MAC layer; a MAC header extension of a variable length for controlling a plurality of second type of functions of the MAC layer; a PHY header for synchronizing the behavior of the PHY layer; and a CRC segment for a cyclic redundancy checksum for checking transmission of the MAC header, the PHY header, and the MAC header extension. The MAC header comprises a size indication of the MAC header extension. The payload data packet may comprise a separate CRC segment for cyclic redundancy checksum for checking transmission of the rest of the payload data packet

BRIEF DESCRIPTION OF THE DRAWINGS

FIG. 7 is a diagram illustrating a MAC header format in a first embodiment of the invention;

FIG. 8 is a diagram illustrating a MAC control field format of FIG. 7;

FIG. 9 is a diagram illustrating a MAC header extension control field format of FIG. 7;

FIG. 14 is a diagram illustrating a MAC header extension length field format in a second embodiment of the invention;

FIG. 15 is a diagram illustrating a MAC control field format in the second embodiment of the invention;

FIG. 16 is a diagram illustrating a MAC header extension control field format in the second embodiment of the invention;

DETAILED DESCRIPTION OF EMBODIMENTS

Two provisional applications by the inventors, 60/774,150 filed on May 17, 2006 and 60/785,772 filed on Mar. 24, 2006, are incorporated by reference.

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Overview of WirelessHD Communication System

Certain embodiments provide a method and system for transmission of uncompressed HD video information from a transmitter to a receiver over wireless channels.

Figure 1:
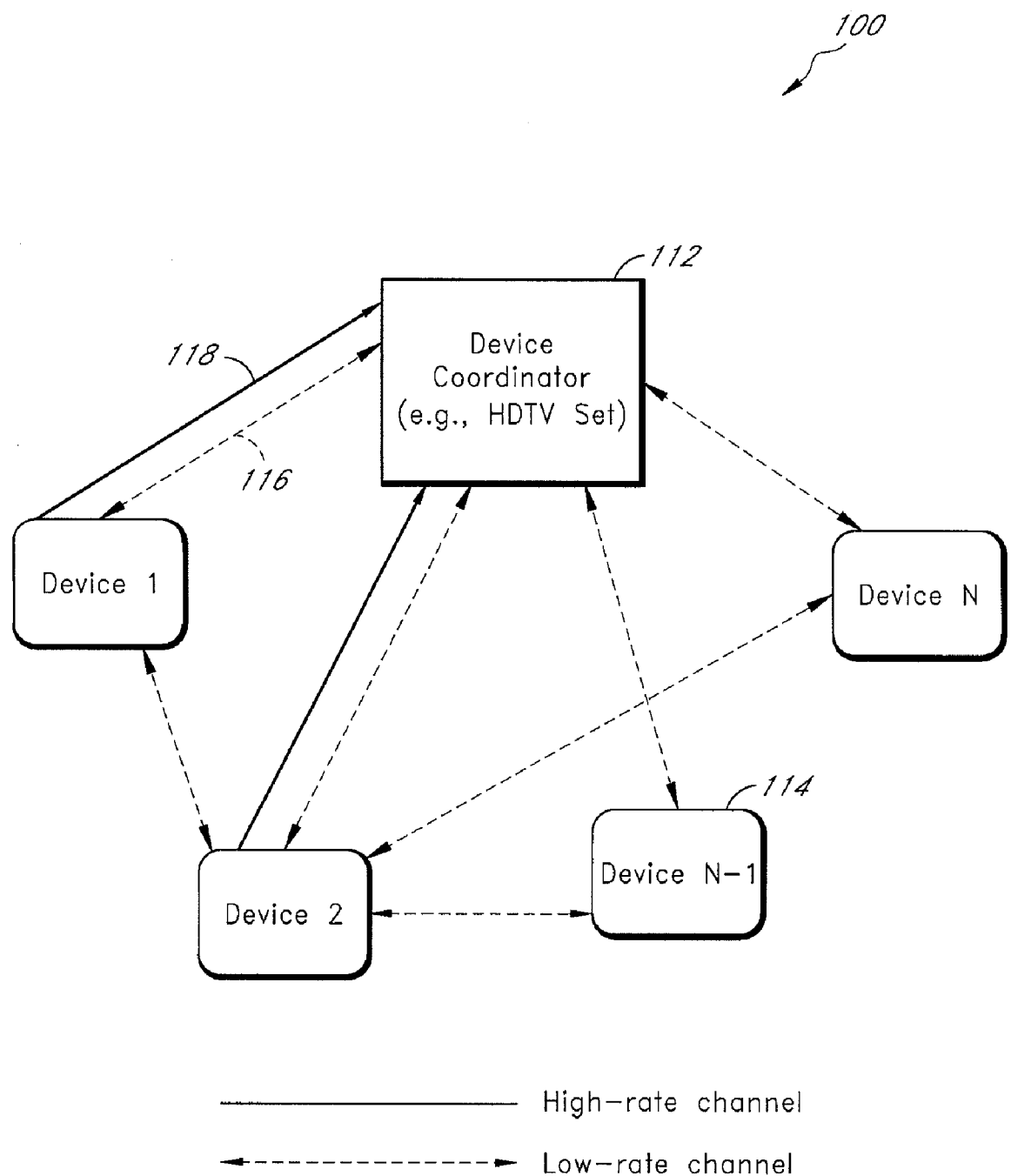
FIG. 1 is a functional block diagram of a wireless network that implements uncompressed HD video transmission between wireless devices according to one embodiment of the system and method.

A wireless video area network (WVAN) consists of one Coordinator and one or more stations as shown in FIG. 1. The Coordinator is normally, but not always, a device that is a sink for audio or video data, e.g., a display, but also potentially a media storage device like a personal video recorder (PVR). A station, on the other hand, is a device that has media that it can either source or sink, potentially at the same time with the time division duplex (TDD) scheme.

The computing and networking industry uses the Open Systems Interconnection Reference Model (OSI model) for communications and computer network protocol design. The OSI model is a hierarchical structure of seven layers that defines the requirements for communications between two devices. The seven layers include application layer, presentation layer, session layer, transport layer, network layer, data link layer, physical layer.

Of particular relevance here are the data link and physical layers. The data link layer provides the functional and procedural means to transfer data between network entities and to detect and possibly correct errors that may occur in the physical layer. The data link layer is divided into two sublayers: the Media Access Control (MAC) layer and the Logical Link Control (LLC) layer. The MAC sublayer controls how a computer on the network gains access to the data and permission to transmit it. The LLC layer controls frame synchronization, flow control and error checking. The physical (PHY) layer defines all the electrical and physical specifications for devices.

Figure 6:
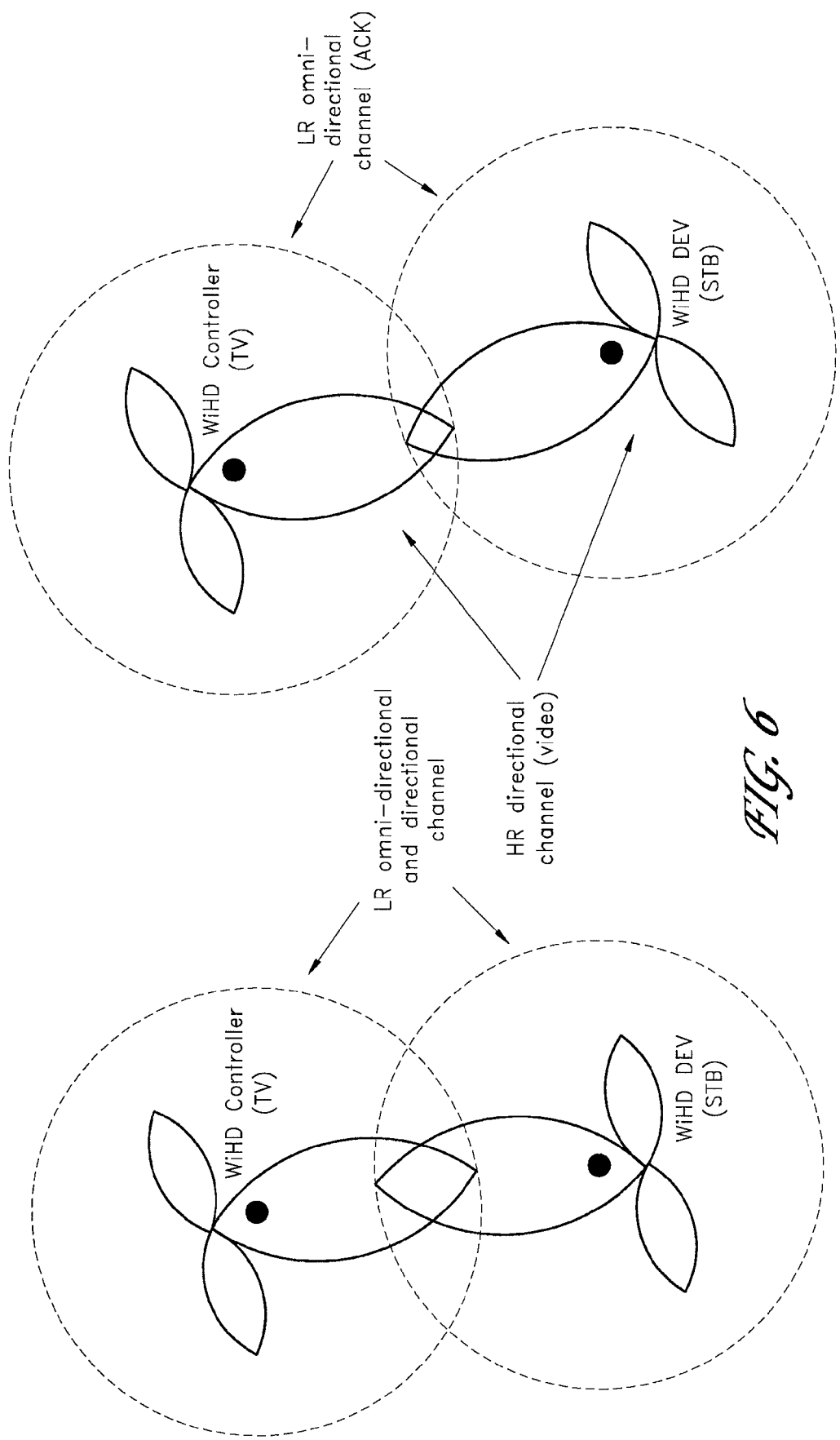
FIG. 6 is an illustration of a WiHD system comprising LRP and HRP channels.

The high-rate PHY (HRP) is a PHY that supports multi-Gb/s throughput at distance of 10 m through adaptive antenna technology. Because of this, the HRP is highly directional and can only be used for unicast connections as shown in FIG. 1 and FIG. 6. The HRP is optimized for the delivery of uncompressed high-definition video, and other data can be communicated using the HRP. To support multiple video resolutions, the HRP has more than one data rate defined. The HRP carries isochronous data such as audio and video, asynchronous data, MAC commands, antenna steering information, and higher layer control data for A/V devices.

The low-rate PHY (LRP) is a multi-Mb/s bidirectional link that also provides a range of 10 m. Multiple data rates are defined for the LRP, with the lower data rates having near omni-directional coverage while the highest data rates are directional as shown in FIG. 1 and FIG. 6. Because the LRP has near omni-directional modes, it can be used for both unicast and broadcast connections. Furthermore, because all stations support the LRP, it can be used for station-to-station links. The LRP supports multiple data rates, including directional modes, and is used to carry low-rate isochronous data such as audio, low-rate asynchronous data, MAC commands including the beacon frame, acknowledgements for HRP packets, antenna steering information, capabilities information, and higher layer control data for A/V devices.

The HRP and LRP operate in overlapping frequency bands and so they are coordinated in a TDMA (time division multiple access) manner by the MAC. The WVAN supports at least one uncompressed 1080p video stream with associated audio at a time. Multiple lower rate uncompressed video streams, e.g., two 1080i video streams, are also supported.

The WVAN supports two types of devices, coordinator and station. The coordinator controls the timing in the WVAN, keeps track of the members of the WVAN, transmits or receives data using the LRP or using the HRP. The station transmits and receives data using the LRP, initiates stream connections, and transmits or receives data using the HRP. The station may be capable of acting as a coordinator in the WVAN. Such a station is referred to as being coordinator capable.

In addition to the two MAC personalities of coordinator and station, each device in the WVAN will have one of four different PHY capabilities; HR0, HRRX, HRTX, and HRTR. HR0 is a device that is not able to either receive or transmit using the HRP. HRRX is a device that is able to receive in the HRP, but is not able to transmit using the HRP. HRTX is a device that is able to transmit in the HRP, but is not able to receive using the HRP. HRTR is a device that is able to both transmit and receive using the HRP.

All compliant WirelessHD devices are able to transmit and receive using the LRP. Both the HRP and LRP may provide multiple data rates.

Detailed Operation of the WirelessHD Communication Systems

Some embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1 . . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a transmitter of the video information (hereinafter "transmitter 114"). For example, the receiver 112 can be a sink of video and/or audio data implemented, such as, in an HDTV set in a home wireless network environment which is a type of WLAN. The transmitter 114 can be a source of uncompressed video or audio. Examples of the transmitter 114 include a set-top box, a DVD player or recorder, digital camera, camcorder, and so forth.

Figure 2:
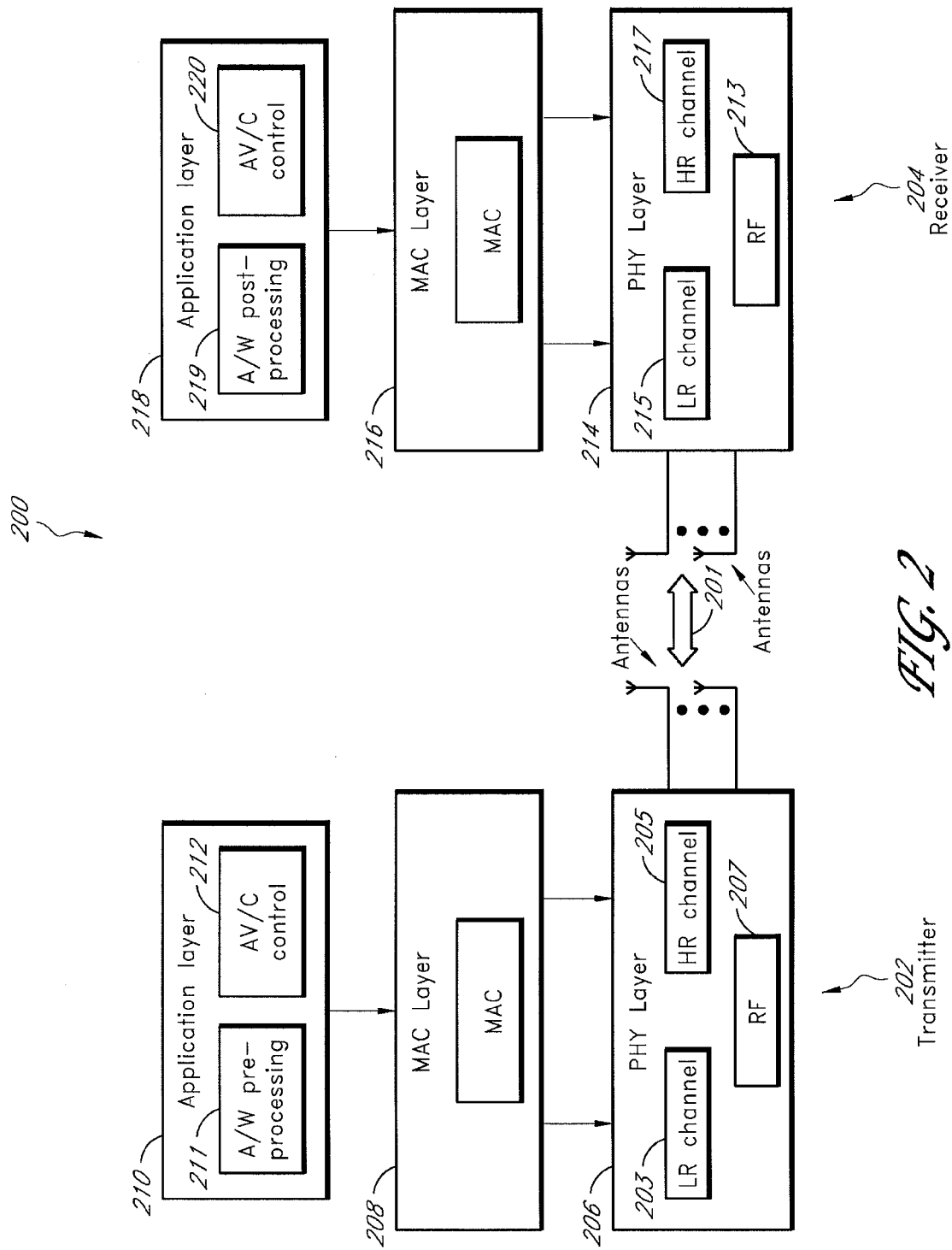
FIG. 2 is a functional block diagram of an exemplary communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection ended, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse of the processing method of the module 211 to regenerate the uncompressed video, for example. The AV/C module 220 operates in a complementary way with the AV/C module 212 of the transmitter 202.

Figure 3:
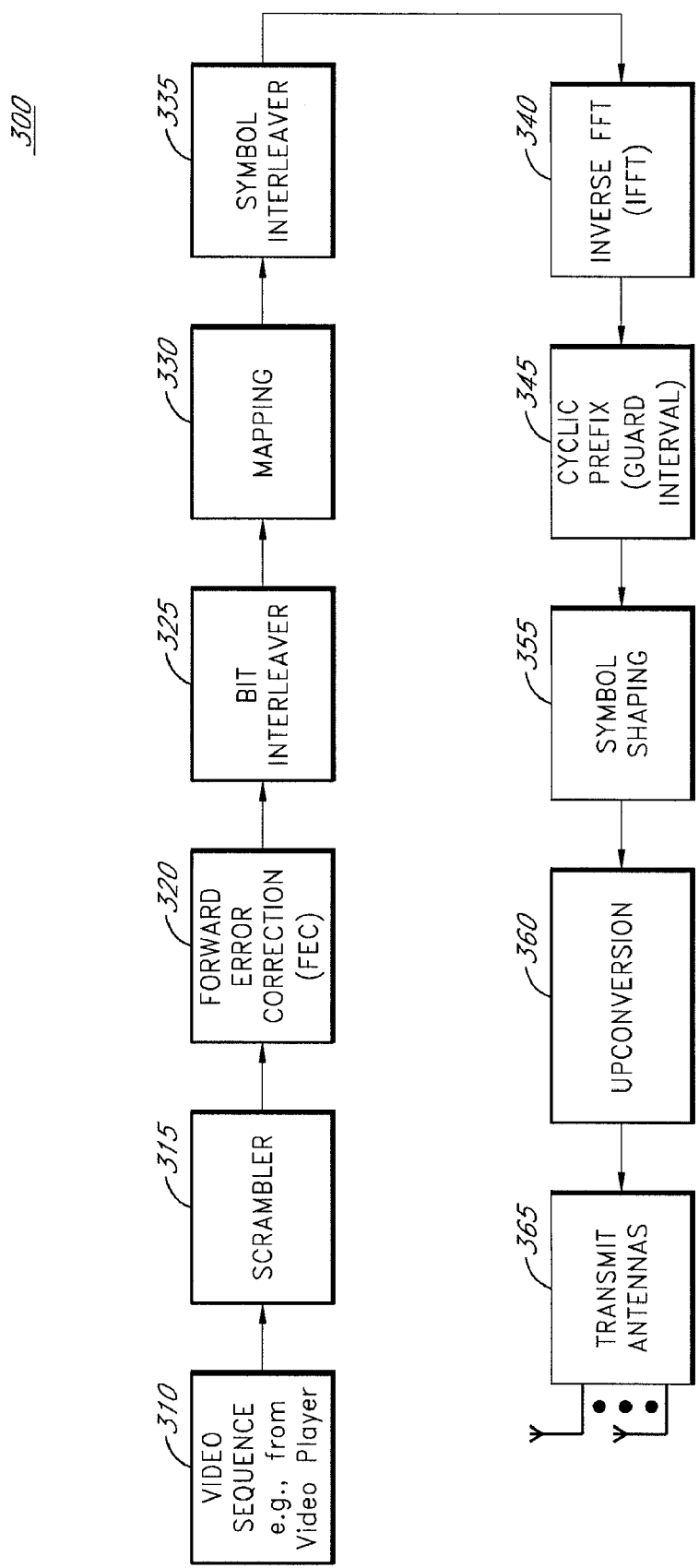
FIG. 3 is a block diagram illustrating components of a transmitter chain.

Referring to FIG. 3, a transmit chain 300 of modules, subsystems or devices, such as used in the PHY block 206 (FIG. 2), will be described. It will be appreciated that these modules, subsystems, or devices can be implemented using hardware, software or a combination of both. A video sequence 310 having video data, such as from a video player or other device, is input into a scrambler 315. The scrambler 315 transposes or inverts signals or otherwise encodes data to make the data unintelligible at a receiver not equipped with a corresponding descrambling device. Scrambling is accomplished by the addition of components to the original signal or the changing of some important component of the original signal in order to make extraction of the original signal difficult. Examples of the latter can include removing or changing vertical or horizontal sync pulses in video signals.

A forward error correction (FEC) subsystem 320 receives output from the scrambler and provides protection against errors during wireless data transmission. The FEC subsystem 320 adds redundant data to the scrambled video data input to the subsystem. The redundant data allows the receiver to detect and correct errors without asking the transmitter for additional data. In adding redundant data to the video data, the FEC subsystem 320 can use error-coding encoders, such as a Reed-Solomon (RS) encoder and a convolutional code (CC) encoder. In other embodiments, the FEC subsystem 320 may use various other encoders, including, but not limited to, a Golay encoder, a Hamming encoder, and a Bose, Ray-Chaudhuri, Hocquenghem (BCH) encoder.

The output of the FEC 320 is sent to a bit interleaver 325. The bit interleaver 325 rearranges a sequence of data bits received from the FEC 320. The bit interleaver 325 serves to provide further error-protection over video data transmitted over a wireless medium. The output of the bit interleaver 325 is sent to a mapper 330. The mapper 330 maps data bits to complex (IQ) symbols (frequency domain data). The complex symbols are used to modulate a carrier for the wireless transmission described above. The mapper 330 can use various modulation schemes, including, but not limited to, Binary Phase-Shift Keying (BPSK), Quadrature Phase-Shift Keying (QPSK), and Quadrature Amplitude Modulation (QAM). In one embodiment, the mapper 330 is a QAM mapper, for example, a 16-QAM mapper or 64-QAM mapper. QAM is a modulation scheme which conveys data by modulating the amplitude of two carrier waves. The two waves, usually sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing such symbols.

The output of the mapper 330 is sent to a symbol interleaver 335 that rearranges the sequence of complex symbols output from the mapper. The illustrated symbol interleaver 335 is positioned after the mapper 330. In other embodiments, the symbol interleaver 335 may be positioned between the FEC and the mapper 330 in place of the bit interleaver. In such embodiments, the symbol interleaver permutes the predetermined number of bits as a symbol group. For example, in an embodiment where a QAM mapper maps four data bits to a complex symbol, the symbol interleaver is configured to interleave groups of four data bits.

In an embodiment where the symbol interleaver 335 is positioned after the mapper 330, the symbol interleaver rearranges the sequence of the symbols output from the mapper 330. In one embodiment, the symbol interleaver 335 can include a random interleaver which employs a fixed random permutation order and interleaves symbols according to the permutation order. For example, the random interleaver may use Radix-2 FF operation. In other embodiments, the symbol interleaver 335 can include a block interleaver. A block interleaver accepts a set of symbols and rearranges them without repeating or omitting any of the symbols in the set. The number of symbols in each set is fixed for a given interleaver. The interleaver's operation on a set of symbols is independent of its operation on all other sets of symbols.

The output of the symbol interleaver 335 is sent to an inverse Fast Fourier Transform (IFFT) module 340. The IFFT 340 transforms frequency domain data from the error-correcting, mapping and interleaving modules back into corresponding time domain data. The IFFT module 340 converts a number of complex symbols, which represent a signal in the frequency domain, into the equivalent time domain signal. The IFFT module 340 also serves to ensure that carrier signals produced are orthogonal. The output of the IFFT 340 is sent to a cyclic prefix adder 345 so as to decrease receiver complexity. The cyclic prefix adder 345 may also be referred to as a guard interval adder. The cyclic prefix adder 345 adds a cyclic prefix interval (or guard interval) to an IFFT-processed signal block at its front end. The duration of such a cyclic prefix interval may be $\frac{1}{32}$, $\frac{1}{16}$, $\frac{1}{8}$, or $\frac{1}{4}$ of the original signal block duration.

A symbol shaping module 355 interpolates and low-pass filters the packet signal generated from the IFFT module 340 and the cyclic prefix adder 345. The output of the symbol shaping module 355 is a complex baseband of the output signal of the IFFT module 340. An upconverter 360 upconverts the output of the symbol shaping module 355 to an intermediate frequency (IF). The upconverter 360 is further configured to upconvert the upconverted signal to a radio frequency (RF). A set of transmit antennas 365 transmit the signal output from the upconverter 360 over a wireless medium, such as the wireless channel 201 (FIG. 2) to a receiver. The transmit antennas 365 can include any antenna system or module suitable for wirelessly transmitting uncompressed HD video signals.

Figure 4:
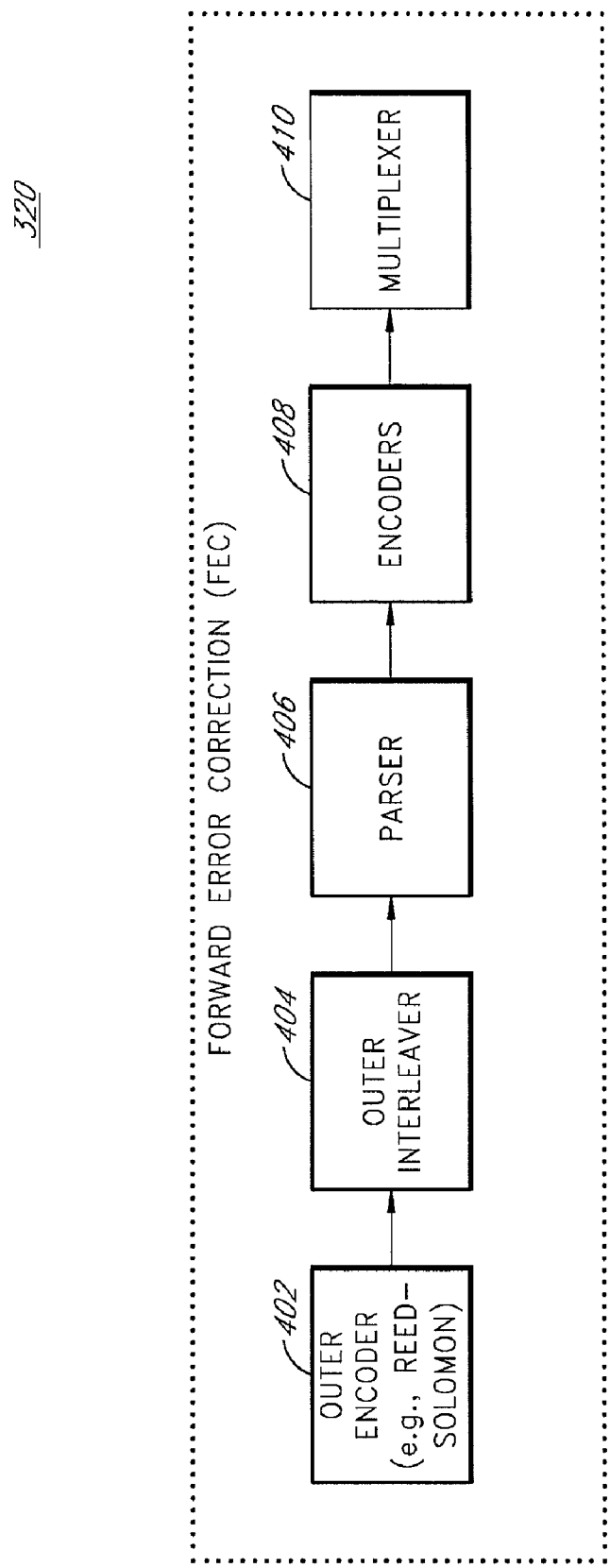
FIG. 4 is a block diagram illustrating components of a forward error correction module of FIG. 3.

FIG. 4 is a block diagram showing a forward error correction module of FIG. 3. The forward error correction (FEC) 307 includes an outer encoder 402, an outer interleaver 404, a parser 406, encoders 408, and a multiplexer 410.

Figure 5:
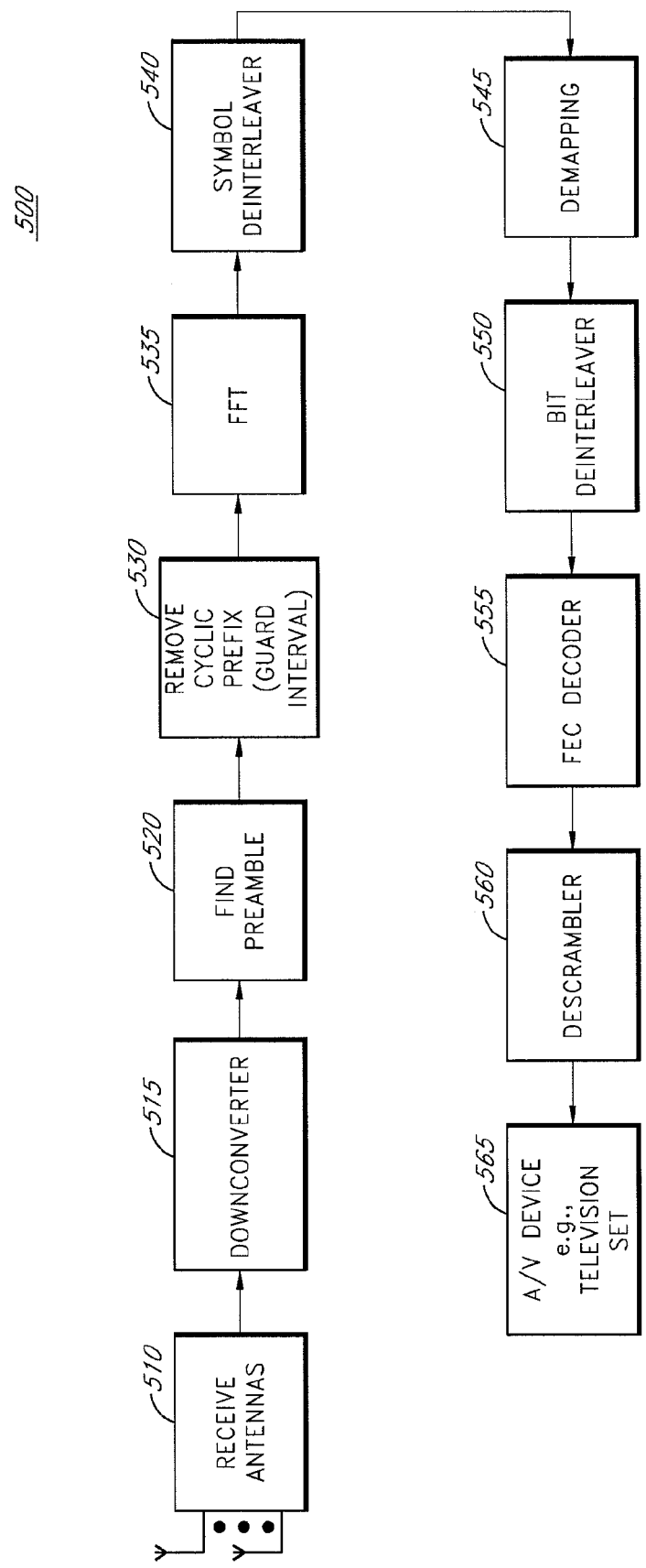
FIG. 5 is a block diagram illustrating components of a receiver chain.

Referring to FIG. 5, a receiver chain 500 of modules, subsystems or devices, such as used in the PHY block 214 (FIG. 2), will be described. The receiver chain modules perform an inverse process to that of the transmitter chain 300 of FIG. 3. The receiver 500 receives an RF signal via the wireless channel 201 (FIG. 2) at receive antennas 510 from the transmit antennas 365 of the transmitter 300. A downconverter 515 downconverts the RF signal to a signal of a frequency suitable for processing. Then, a symbol shaper (not shown) converts the signal into a digital signal. A preamble finder 520 then locates a preamble portion of the digital signal. A cyclic prefix remover 530 removes the cyclic prefix from the signal. Next, a fast Fourier transform (FFT) module 535 transforms the signal (a time-domain signal) into a frequency-domain signal. The output of the FFT 535 is used by a symbol deinterleaver 540 which rearranges the FFT output for a demapper 545. The demapper 545 converts the frequency-domain signal (a complex signal) into a bit stream in the time domain. A bit deinterleaver 550 rearranges the bit stream in the original bit stream sequence as before the bit interleaver 325 of FIG. 3.

Subsequently to the bit deinterleaving, a FEC decoder 555 decodes the bit stream, thereby removing redundancy added by the FEC 320 of FIG. 3. In one embodiment, the FEC decoder 555 includes a demultiplexer, a multiplexer, and a plurality of convolutional code (CC) decoders interposed between the demultiplexer and the multiplexer. Finally, a descrambler 560 receives the output from the FEC decoder 555, and then descrambles it, thereby regenerating the video data sent from the transmitter 300 of FIG. 3. A video device 565 can now display video using the video data. Examples of the video device include, but are not limited to, a CRT television, an LCD television, a rear-projection television and a plasma display television. It will be appreciated that audio data can also be processed and transmitted in the same manner along with video data by the WirelessHD A/V system described above. The audio data can be processed and transmitted using a different wireless transmission scheme. The descrambler 560, FEC decoder 555, bit deinterleaver 550, demapper 545, symbol deinterleaver 540, FFT 535 cyclic prefix remover 530, downconverter 515 and receive antennas 510 of the receiver chain 500 perform analogous but inverse functions of the corresponding scrambler 315, FEC 320, bit interleaver 325, mapper 330, symbol interleaver 335, IFFT 340, cyclic prefix adder 345, upconverter 360 and transmit antennas 365 of the transmit chain 300.

FIG. 6 is a conceptual diagram illustrating a WirelessHD system having LR and HR channels. The dots represent the controller and the stations. The circles and football-shaped curves are the ranges for the channels. The HR channels are highly directional because of beamforming while the LR channels are either directional or omni-directional. The TV may receive uncompressed video on HRP, and then reply with directional ACK on LRP.

Cyclic Redundancy Checksum

A cyclic redundancy checksum (CRC) is information having bits which is computed and used to produce a checksum against a block of data, such as a packet of data communicated via network communication. The checksum is used to detect errors after transmission. A CRC is computed and appended to the packet of data before transmission, and verified afterwards by the recipient to confirm that no changes occurred during the transmission.

In the WirelessHD communication system having a transmitter and a receiver, the transmitter computes a cyclic redundancy checksum for a data packet which is being sent to the receiver and appends the checksum to the data packet. The receiver, receiving the data packet and the checksum, computes its own cyclic redundancy checksum for the received data packet, and compares the computed checksum with the received checksum to determine whether contents of the data packet changed during the transmission.

The data packet includes a payload to transmit, a PHY header, and a MAC header. The CRC is attached to the MAC header as a part of the data packet. Usually, the MAC header is variable in its size. It is inefficient to compute a CRC for a data packet of a variable size.

An aspect of the invention is to provide a MAC header of a fixed size or length. Since some fields of the MAC header could be of a variable length, a MAC header extension is used to handle the variable part of the MAC header. The variable part of the MAC header is isolated in the MAC header extension, and the length information or the size indication of the variable part is used in determining the CRC for the variable part of the MAC header.

More specifically, the non-extended portion, the MAC header, which is the portion of the data packet that is free from possibility of a variable size, is processed quite efficiently. In particular, computing the CRC for the PHY and MAC headers, both being of fixed lengths, is very efficient. For the MAC header extension which is of a variable length, a separate CRC is computed and the computation is facilitated by providing a size indication of the MAC header extension. The separate CRC computation enhances the reliability of the transmission of the MAC header extension in addition to the computing speed.

FIG. 7 is a diagram illustrating MAC header format for a first embodiment of the invention. The fields and the order of the fields are not critical, and may depend on specific applications and embodiments. The fields may be rearranged, for example, Protocol version field Packet Control filed may be moved from MAC Control header to the MAC header. However, the essence of the field does not change. The MAC header 700 may comprise fields for a MAC control 710, a MAC header extension control 730, a destination ID 751, a source ID 753, a wireless video area network ID 755, a stream index 757, and a sequence number 759. The destination ID (DestID) field 751 contains a device ID of the destination. The source ID (SrcID) field 753 contains a device ID of the device that sends out the data packets. The wireless video area network ID (WVNID) field 755 contains an identifier of a WVAN. The stream index field 757 is used to identify the stream type of the data packets; video stream or audio stream. The sequence number field 759 may be a modulo 256 counter that increments the sequence number for each packet that is sent for a particular stream index. Each device working as a source maintains a separate counter for counting each stream it sends.

FIG. 8 is a diagram illustrating a MAC control field of the MAC header of FIG. 7. The MAC control field 710 may comprise a protocol version field 711, a packet type field 712, an acknowledgement (ACK) policy field 713, a security bit 714, a retry bit 715, a more-data bit 716, a transport priority field 717, and a reserved field 718. The protocol version field 711 indicates the revision of the protocol used for the data packet. The packet type field 712 indicates a type of the data packet. The ACK policy field 713 indicates the ACK policy. The security bit 714 is set to a value of one for secure packets and is set to zero otherwise. The retry bit 715 is set to a value of one if the packet is either a data packet or MAC command packet and if the packet is for a retransmission. It is set to zero otherwise. The more-data bit 716 is set to a value of one if a device does not send any more packets in a time period It is set to zero otherwise. The transport priority field 717 indicates the priority of the packet.

FIG. 9 is a diagram illustrating a MAC header extension control field of the MAC header of FIG. 7. The MAC header extension control field 730 comprises a link adaptation extension bit 731, a composite frame bit 732, a reliable broadcast or multicast (ReBoM) bit 733, a MAC header extension length field 735, and a plurality of reserved bits 734. The MAC header extension length field 735 indicates the length of the MAC header extension 770 in terms of bytes. In the first embodiment of the invention, the MAC header extension length field 735 is one byte, and the MAC header extension 770 can be a maximum of 255 bytes long.

The first embodiment of the invention may include the ReBoM header of an 8 bytes size, the link adaptation extension header of a 2 bytes size, and a subpacket header of a 1+1+5*2=12 bytes size with a maximum of five types. Then the MAC header extension 770 can include a ReBoM header, link adaptation extension header, and a composite frame header of a maximum of 20 subpackets, each comprising of five types. When a bit at a certain position is set to one or zero, a corresponding header is present or absent, respectively. The order of additional headers shall be in the same order as the MAC header extension is specified. When the ReBoM bit 733 in the MAC header extension control field 730 is set to 1, the DestID field 751 will be ignored.

Figure 10:
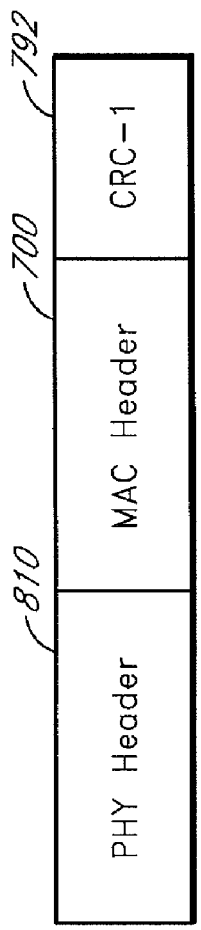
FIG. 10 is a diagram illustrating a first CRC for a MAC header and a PHY header.

FIG. 10 is a diagram illustrating a first CRC for the MAC header and the PHY header. The first CRC 792 is computed for the PHY header 810 and the MAC header 700, both of which are of fixed lengths. The first CRC 792 may be set using IEEE 802.11 standards; CRC-16 or CRC-32.

Figure 11:
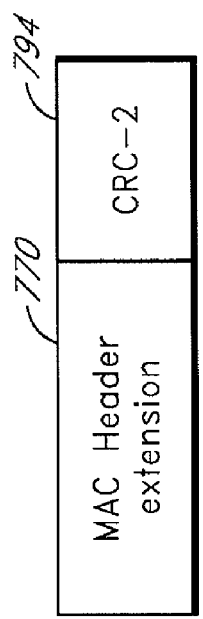
FIG. 11 is a diagram illustrating a second CRC for a MAC header extension.

FIG. 11 is a diagram illustrating a second CRC for the MAC header extension. The second CRC 794 is computed for the MAC header extension 770 of a variable length. Since the MAC header extension length field 735 in the MAC header 700 indicates the length of the MAC header extension 770, the second CRC 794 can be calculated efficiently.

Figure 12:
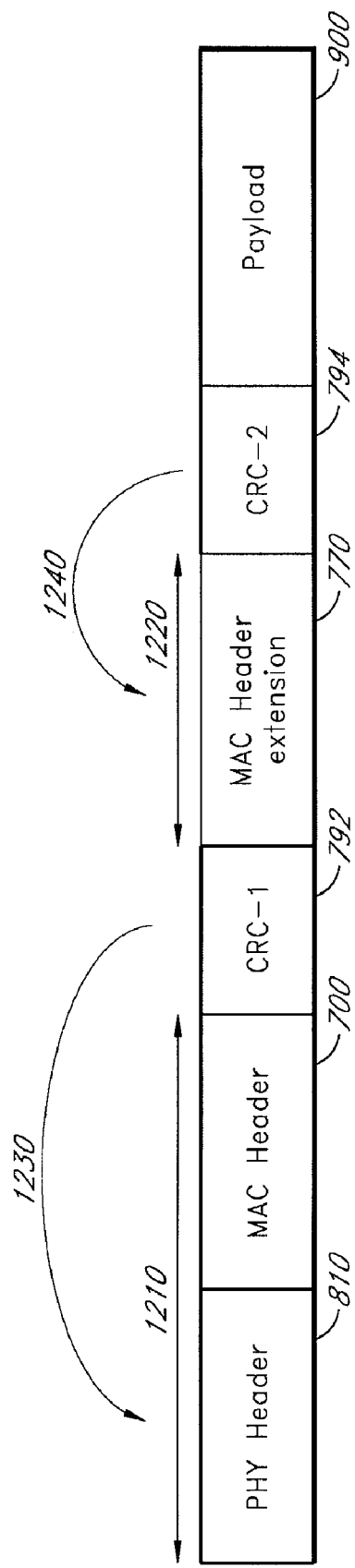
FIG. 12 is a diagram illustrating a frame format including a PHY header and an MPDU.

FIG. 12 is a diagram illustrating a frame format including a PHY header and an MPDU. The frame format comprises a PHY header 810, a MAC header 700, a first CRC 792, a MAC header extension 770, a second CRC 794, and a payload 900. The first CRC 792 is computed for a first portion 1210 including the PHY header 810 and the MAC header 700, and since the PHY header 810 and the MAC header 700 have fixed sizes computing CRC is efficient. The MAC header extension 770 is used to include some fields which are not common and included based on certain applications. The second CRC 794, a separate CRC, is computed for a second portion 1220 including the MAC header extension 770. Computing the second CRC is efficient because it is computed with the size indication or the length information provided by the MAC header 700, and it is also reliable against channel errors because the separate second CRC 794 is computed for the MAC header extension 770. The first CRC 792 is used for verifying 1230 the transmission of the first portion 1210 of the data packet, and the second CRC 794 is used for verifying 1240 the transmission of the second portion 1220 of the data packet.

In some cases when the second CRC 794 is failed due to some bit errors in MAC header extension 1220, the MAC and PHY headers 1210 can still be processed since the first CRC 1230 succeeded.

Alternatively, a single CRC field may be used instead two CRCs.

Figure 13:
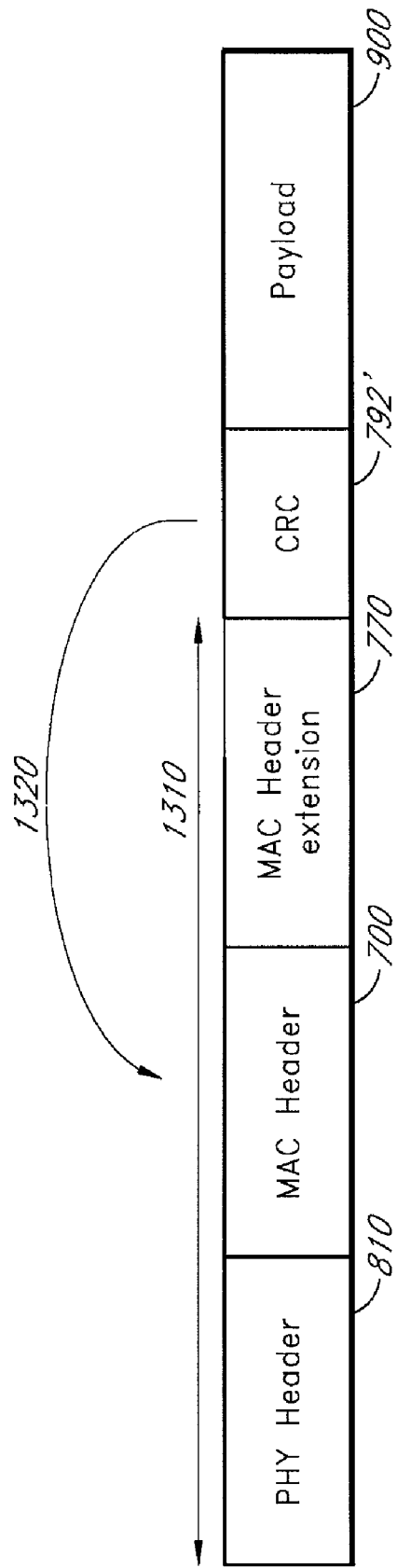
FIG. 13 is a diagram illustrating a frame format including a single CRC.

FIG. 13 is a diagram illustrating a frame format including a PHY header and an MPDU. The frame format comprises a PHY header 810, a MAC header 700, a CRC 792', a MAC header extension 770, and a payload 900. The CRC 792' is computed for a portion 1310 including the PHY header 810, the MAC header 700, and the MAC header extension 770.

FIGS. 14 through 17 and 19 show a second embodiment of the invention.

Figure 17:
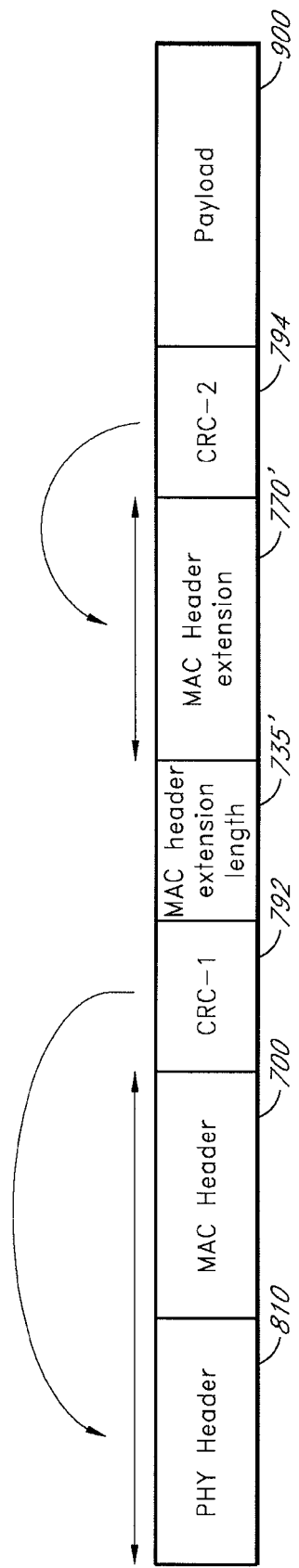
FIG. 17 is a diagram illustrating a frame format including a MAC header extension length in front of the MAC header extension.

FIG. 14 is a diagram illustrating a MAC header extension length field 735'. Since the ReBoM field 733' and the link adaptation extension field 731' are of fixed sizes, as shown in FIG. 16, the receiver 204 can implicitly estimate the size of the MAC header extension 770 comprising these two headers. However, the composite header field is of a variable length. Therefore, when the composite frame field 732' in the MAC header extension control field 730' is set to 1, the MAC header extension length field 735' of FIG. 14 is now included as a first field in the MAC header extension 770' as shown in FIG. 17. The length field 735' indicates the length of the MAC header extension.

FIG. 15 is a diagram illustrating a MAC header of the second embodiment of the invention. Under this scheme, the MAC header 700 of FIG. 7 of the first embodiment is modified as shown in FIG. 15, and the MAC header 700' may comprise fields for a MAC control 710', a MAC header extension control 730', a destination ID 751', a source ID 753', a wireless video area network ID 755', a stream index 757', and a sequence number 759'. A difference between FIG. 7 and FIG. 15 is the number of octets of the MAC header extension control field. That is, the number of octets of the MAC header extension control field is reduced from 2 in FIG. 7 to 1 in FIG. 15.

FIG. 16 is a diagram illustrating a MAC header extension control field of the second embodiment of the invention. The MAC header extension control field 730 of FIG. 9 of the first embodiment is modified as shown in FIG. 16. A difference between FIG. 9 and FIG. 16 is the MAC header extension length 735. Since the MAC header extension length field 735' of FIG. 14 is moved to the first field in the MAC header extension 770' of FIG. 17, the size of the MAC header extension control field 730' is reduced by 8 bits as shown in FIG. 15. The number of octets of the MAC header extension control field is reduced from 2 in FIG. 7 to 1 in FIG. 15.

Figure 18:
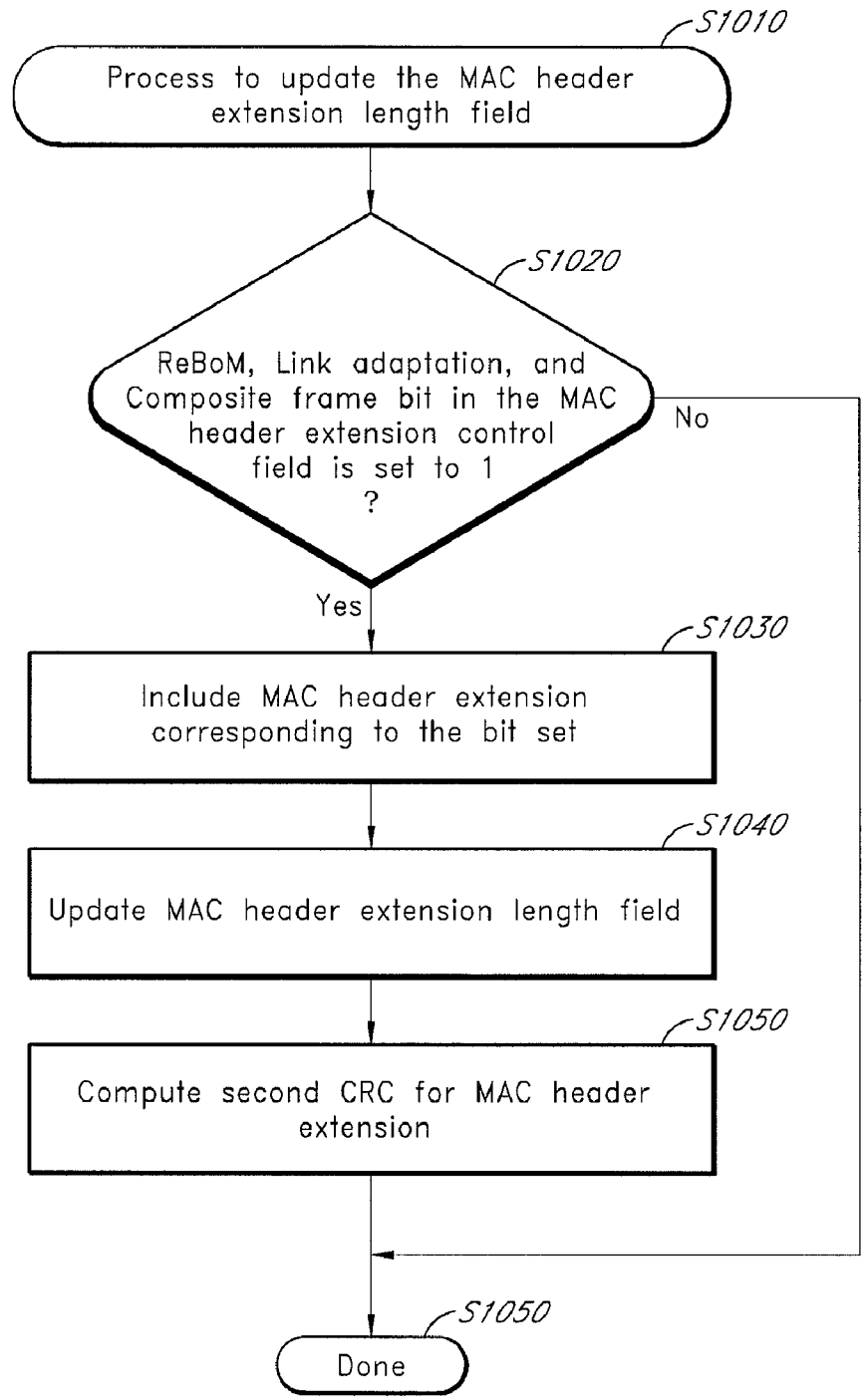
FIG. 18 is a flowchart illustrating updating of the MAC header extension length field according to the first embodiment.

FIG. 18 is a flowchart illustrating updating of the MAC header extension length field for the first embodiment. In state S1010, the process to update the MAC header extension length field 735 starts. In state S1020, the ReBoM 733, Link adaptation 731, and Composite frame bit 732 in the MAC header extension control field 730 are checked to see whether set to 1 or not. In state S1030, if at least one of the bits is set to 1, then the MAC header extension corresponding to the bit is included. In state S1040, the MAC header extension length field 735 is updated since the corresponding MAC header extension was included in state 1030. In state S1050, the second CRC 794 for the MAC header extension 770 is computed. In state S1060, the process to update is finished.

Figure 19:
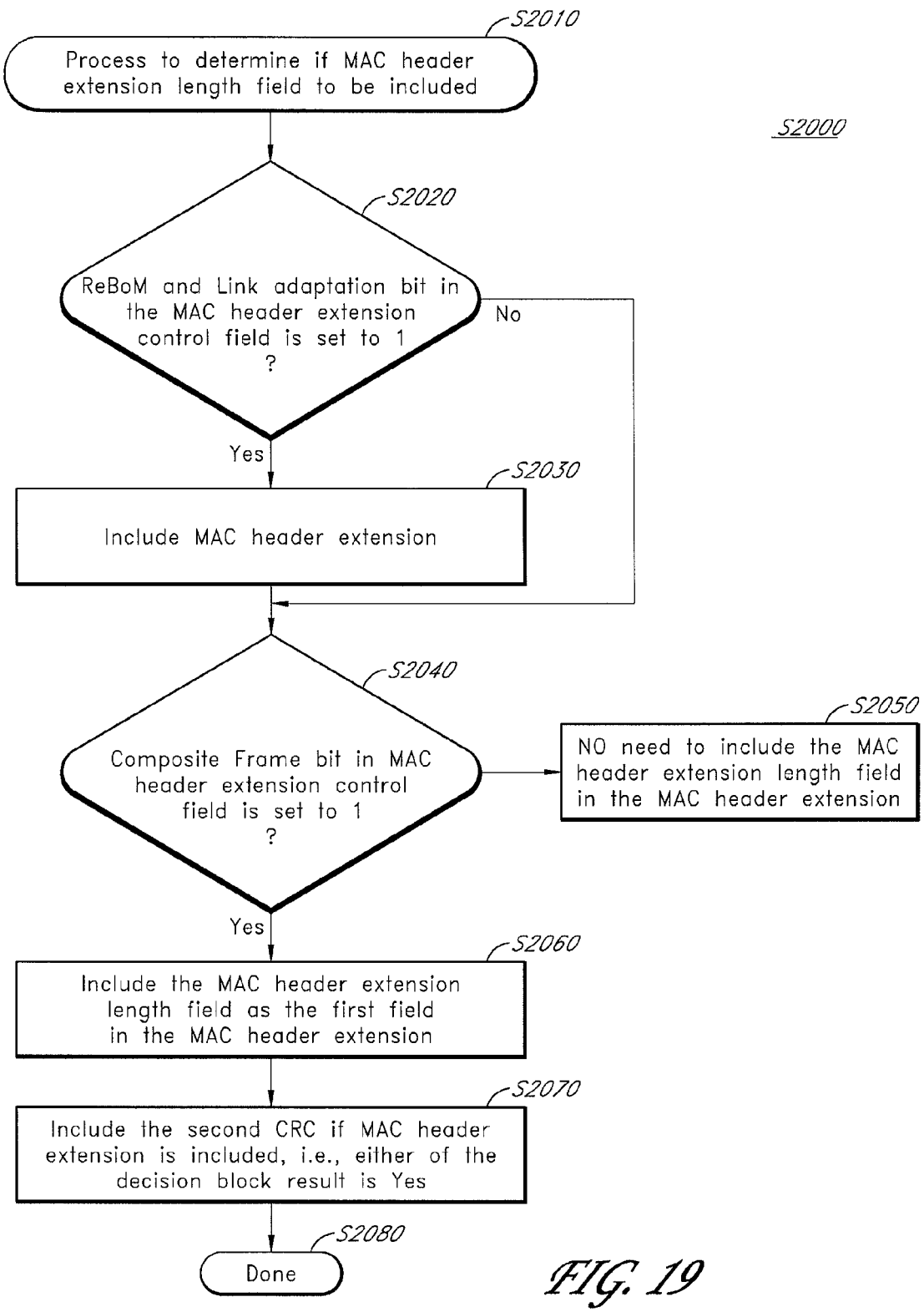
FIG. 19 is a flowchart illustrating an addition of the MAC header extension length field in the MAC header extension according to the second embodiment.

FIG. 19 is a flowchart illustrating the process for providing an addition of the MAC header extension length field 735' in the MAC header extension 770' according to the second embodiment. In state S2010, the process to determine if the MAC header extension length field 735' be included in the MAC header extension 770' starts. In state S2020, the ReBoM 733' and Link adaptation 731' bit are checked to see whether any one of them are set to be 1 or not. In state S2030, if any one of them is set to be 1, then the MAC header extension 770' is included. In state S2040, the composite frame bit 732' in the MAC header extension control field 730' is checked to see whether the composite frame bit 732' is set to a value of one or not. In state S2060, if the composite frame bit 732' is set to 1, then the MAC header extension length field 735' is included as the first field of the MAC header extension 770'. In state S2050, if the composite frame bit 732' is set to 0, the MAC header extension length field 735' is not included in the MAC header extension 770'. In state S2070, when either S2020 or S2040 was Yes, the second CRC 794' is included.

In the first and second embodiments, the first CRC 792 and the second CRC 794 can be combined to a CRC 792' as shown in FIG. 13.

The MAC header structure according to the embodiments of the invention is not limited to WirelessHD. The embodiments can be used in general with any MAC protocol in wired or wireless environment.

CONCLUSION

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A non-transitory computer readable medium storing a data structure of a MAC header for a High Definition communication system, using a open systems interconnection (OSI) reference model including an application layer, a media access controller (MAC) layer, and a physical (PHY) layer, comprising:

a payload data packet received from the application layer;
a fixed length MAC header for controlling a plurality of first type of functions of the MAC layer;
a MAC header extension of a variable length for controlling a plurality of second type of functions of the MAC layer, wherein the MAC header extension is isolated from the MAC header;
a PHY header for synchronizing the behavior of the PHY layer;
a first CRC segment for a cyclic redundancy checksum for checking transmission of the MAC header and the PHY header; and
a second CRC segment for a cyclic redundancy checksum for separately checking the transmission of the MAC header extension,
wherein the MAC header comprises a size indication of the MAC header extension, the size indication referred in facilitating checking of the second CRC segment,
wherein the MAC header extension further comprises a ReBoM header, a Link adaptation extension header, and a composite frame header, and wherein presence or absence of the ReBoM header, the Link adaptation extension header, and the composite frame header are determined by values of the corresponding MAC header extension control bits.

2. The computer readable medium of claim 1, wherein the first type of functions perform processes comprising:
controlling the MAC layer;
controlling the MAC header extension;
indicating a destination device of the payload data packet;
indicating a source device of the payload data packet;
identifying a wireless video audio net work to which the destination and source devices belong;
identifying the type of the data packet; and
indexing the data packet.

3. The computer readable medium of claim 2, wherein the MAC header comprises:
a MAC control field for controlling the MAC layer;
a MAC header extension control field for controlling the MAC header extension;
a destination ID field for indicating the destination device which provided the payload data packet;
a source ID field for indicating the source device which provided the payload data packet;
a wireless video audio network ID field for identifying the wireless video audio network to which the destination and source devices belong;
a stream index field for identifying the type of the data packet; and
a sequence number field provided by a modulo-counter for indexing the data packet.

4. The computer readable medium of claim 3, wherein the MAC control field comprises:
a protocol version field for indicating a version of a protocol used for the data packet;
a packet type field for indicating a type of the data packet;
a security bit for indicating secure data packets;
a retry bit for indicating if the packet is either a data packet or MAC command and if the packet is retransmitted;
a more-data bit for indicating whether the device will be sending any more packets in the reserved time block; and
a transport priority field for indicating the priority of the packet.

5. The computer readable medium of claim 3, wherein the MAC header extension control field comprises:
an MAC header extension length field for indicating the length of the MAC header extension;
a link adaptation extension bit;
a ReBoM (reliable broadcast or multicast) control bit; and
a composite frame control bit.

6. The computer readable medium of claim 3, wherein the modulo counter comprises a modulo 256 counter, and wherein the sequence number is incremented for each packet sent.

7. The computer readable medium of claim 1, wherein the first CRC segment is set by CRC-16 or CRC-32.

8. The computer readable medium of claim 1, wherein the second type of function comprises device-dependent functions and application-dependent functions.

9. A method of communicating payload data in a High Definition communication system, the method comprising:
receiving payload data comprising uncompressed video data from the application layer;
encapsulating at least a portion of the payload data with a fixed size media access controller layer (MAC) header, an isolated MAC header extension of a variable size, a first checking data segment, and a second checking data segment to produce a MAC Protocol Data Unit (MPDU), wherein the MAC header extension is isolated from the MAC header, wherein the first checking data segment comprises a first cyclic redundancy checksum (first CRC) for a physical layer (PHY) header and the MAC header, wherein the second checking data segment comprises a second cyclic redundancy checksum (second CRC) for the MAC header extension;
appending the PHY header for synchronization to the MPDU; and
transmitting the PHY header appended MPDU to a receiver.

10. The method of claim 9, wherein the PHY header and the MAC header for which the first CRC is computed is of a fixed size, and wherein the MAC header comprises a size indication of the MAC header extension which facilitates calculating of the second CRC.

11. The method of claim 9, wherein the MAC header extension comprises device-dependent fields and application-dependent fields.

12. The method of claim 9, further comprising:
generating a first cyclic redundancy checksum for the PHY header and the MAC header at the receiver;
generating a second cyclic redundancy checksum for the MAC header extension at the receiver; and
determining whether the act of transmitting is successful by comparing the computed first and second cyclic redundancy checksum with the received first and second cyclic redundancy checksum.

13. The method of claim 12, wherein the act of computing the second cyclic redundancy checksum comprises using the size indication of the MAC header extension extracted from the MAC header extension.

14. The method of claim 12, wherein the act of determining comprises determining the act of transmitting is successful when the computed first cyclic redundancy checksum is matched with the received first cyclic redundancy checksum.

15. The method of claim 9, wherein the first CRC segment is computed by using CRC-16 or CRC-32.

16. The method of claim 9, wherein the MAC header comprises a size indication of the MAC header extension.

17. The method of claim 9, wherein the MAC header extension only comprises MAC header variable length fields and the fixed size MAC header only comprises fixed length fields.

18. The method of claim 10, wherein upon the first CRC passing due to being free of errors in the MAC header and the PHY header, and the second CRC failing due to bit errors in the MAC header extension, processing the MAC header and the PHY header.

19. The method of claim 9, wherein the first CRC is only used for the PHY header and the MAC header, and the second CRC is only used for the MAC header extension.

20. The method of claim 9, wherein the MAC header extension comprises a ReBoM header, a Link adaptation extension header, and a composite frame header, and wherein presence or absence of the ReBoM header, the Link adaptation extension header, and the composite frame header is determined by values of corresponding MAC header extension control bits in the MAC header.

21. The method of claim 9, wherein the MAC header extension is isolated from the MAC header by the first checking data segment.

22. The method of claim 9, wherein fields of the MAC header and fields of the MAC header extension are distinct and have separate field boundaries.

23. A system for communicating payload data in a High Definition communication system, comprising:
means for receiving payload data comprising uncompressed video data from the application layer;
means for encapsulating at least a portion of the payload with a fixed size media access controller layer (MAC) header, an isolated MAC header extension of a variable size, a first checking data segment, and a second checking data segment to produce a MAC Packet Data Unit (MPDU), wherein the MAC header extension is isolated from the MAC header, wherein the first checking data segment comprises a first cyclic redundancy checksum (first CRC) for a physical layer (PHY) header and the MAC header, wherein the second checking data segment comprises a second cyclic redundancy checksum (second CRC) for the MAC header extension;
means for appending the PHY header for synchronization to the MPDU; and
means for transmitting the PHY header appended MPDU to a receiver, wherein the transmitting means comprise an antenna,
wherein the MAC header extension comprises a ReBoM header, a Link adaptation extension header, and a composite frame header, and wherein presence or absence of the ReBoM header, the Link adaptation extension header, and the composite frame header is determined by values of corresponding MAC header extension control bits in the MAC header.

24. The system of claim 23, wherein the PHY header and the MAC header for which the first CRC is computed is of fixed size, and wherein the MAC header comprises a size indication of the MAC header extension which facilitates calculating of the second CRC.

25. The system of claim 23, wherein the MAC header extension comprises device-dependent fields and application-dependent fields.

26. The system of claim 23, further comprising:
means for generating a first cyclic redundancy checksum for the PHY header and the MAC header at the receiver;
means for generating a second cyclic redundancy checksum for the MAC header extension at the receiver; and
means for determining whether the transmission is successful by comparing the computed first and second cyclic redundancy checksum with the received first and second cyclic redundancy checksum.

27. The system of claim 26, wherein the means for computing the second cyclic redundancy checksum comprises a means for using the size indication of the MAC header extension extracted from the MAC header.

28. The system of claim 23, wherein the first CRC segment is computed by using CRC-16 or CRC-32 defined in IEEE 802.11 standard (1999 (R2003) and its amendments).

29. The system of claim 23, wherein the MAC header comprises a size indication of the MAC header extension.

30. A non-transitory computer readable medium storing a data structure of a MAC header for a High Definition communication system, using an OSI model including an application layer, a MAC layer, and a PHY layer, comprising:
a payload data packet from the application layer;
a fixed length MAC header;
a MAC header extension of a variable length, wherein the MAC header extension is isolated from the MAC header;
a PHY header for synchronizing the behavior of the PHY layer;
a first CRC segment for a cyclic redundancy checksum for only checking transmission of the MAC header and the PHY header; and
a second CRC segment for a cyclic redundancy checksum for only checking transmission of the MAC header extension,
wherein the MAC header extension comprises a size indication of the MAC header extension for facilitating checking of the second CRC segment,
wherein the MAC header extension further comprises a ReBoM header, a Link adaptation extension header, and a composite frame header, and wherein presence or absence of the ReBoM header, the Link adaptation extension header, and the composite frame header is determined by values of corresponding MAC header extension control bits in the MAC header.

31. The computer readable medium of claim 30, wherein the MAC header comprises:
a MAC control field for controlling the MAC layer;
a MAC header extension control field for controlling the MAC header extension;
a destination ID field for indicating a destination device of the payload data packet
a source ID field for indicating a source device of the payload data packet;
a wireless video audio network ID field for identifying a wireless video audio network to which the destination and source devices belong;
a stream index field for identifying the type of the data packet; and
a sequence number field provided by a modulo-counter for indexing the data packet.

32. The computer readable medium of claim 31, wherein the MAC header extension control field comprises:
an MAC header extension length field for indicating the length of the MAC header extension;
a link adaptation extension bit;
a ReBoM (reliable broadcast or multicast) control bit; and
a composite frame control bit.

33. The computer readable medium of claim 30, wherein the composite frame header is of a variable length, and wherein if the composite frame control bit is set, the composite frame header is included in the MAC header extension and a size indication of the MAC header extension is included in the MAC header extension.

34. A non-transitory computer readable medium storing a data structure of a MAC header for a High Definition communication system, the data structure comprising:
   a payload data packet received from the application layer;
   a fixed length media access controller layer (MAC) header for controlling a plurality of first type of functions of the MAC layer, wherein the fixed size MAC header only comprises fixed length fields;
   a MAC header extension of a variable length for controlling a plurality of second type of functions of the MAC layer, wherein the MAC header extension is isolated from the MAC header and only comprises MAC header variable length fields,
   a first checking data segment, and a second checking data segment to produce a MAC Protocol Data Unit (MPDU), wherein the first checking data segment comprises a first cyclic redundancy checksum (first CRC) for a physical layer (PHY) header and the MAC header, wherein the second checking data segment comprises a second cyclic redundancy checksum (second CRC) for the MAC header extension;
   the PHY header for synchronizing the behavior of the PHY layer.

35. The computer readable medium of claim 34, wherein the payload data packet comprises a separate CRC segment for cyclic redundancy checksum for checking transmission of the rest of the payload data packet.

36. A receiving device for receiving payload data in a High Definition communication system, comprising:
   a receiver for receiving payload data comprising uncompressed video data, wherein at least a portion of the payload is encapsulated with a fixed size media access controller layer (MAC) header, an isolated MAC header extension of a variable size, a first checking data segment, and a second checking data segment to produce a MAC Packet Data Unit (MPDU), wherein the MAC header extension is isolated from the MAC header, wherein the first checking data segment comprises a first cyclic redundancy checksum (first CRC) for a physical layer (PHY) header and the MAC header, wherein the second checking data segment comprises a second cyclic redundancy checksum (second CRC) for the MAC header extension.

37. A transmitter device for communicating payload data in a High Definition communication system, comprising:
   a transmitter including:
   an application layer;
   a media access controller (MAC) layer;
   a physical (PHY) layer, wherein payload data comprising uncompressed video data is communicated from the application layer to the PHY layer,
wherein the MAC layer including means for encapsulating at least a portion of the payload with a fixed size MAC header, an isolated MAC header extension of a variable size, a first checking data segment, and a second checking data segment to produce a MAC Packet Data Unit (MPDU), wherein the MAC header extension is isolated from the MAC header, wherein the first checking data segment comprises a first cyclic redundancy checksum (first CRC) for a PHY header and the MAC header, wherein the second checking data segment comprises a second cyclic redundancy checksum (second CRC) for the MAC header extension;
   means for appending the PHY header for synchronization to the MPDU;
   and means for transmitting the PHY header appended MPDU in the system, wherein the transmitting means comprising an antenna.

* * * * *